G. H. EASTMAN.
Grist-Alarm
No. 6,655. Reissued Sept. 21, 1875.
FIG. I.
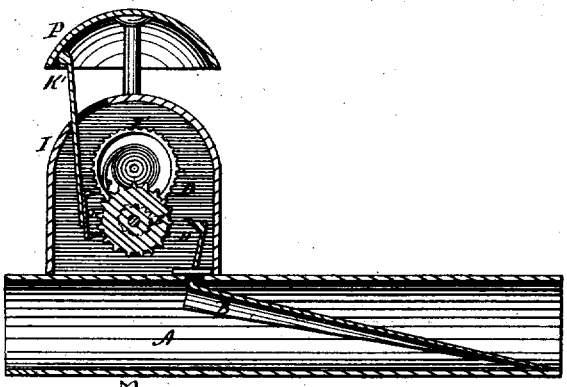
FIG. II.
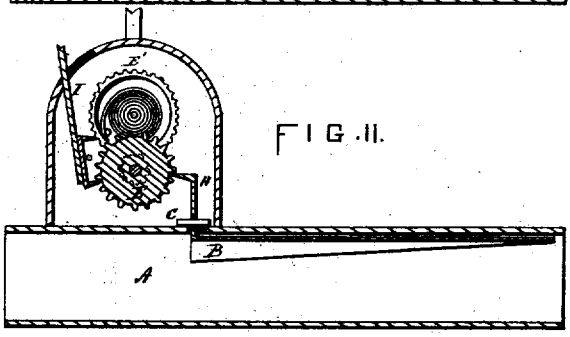
WITNESSES.
F. B. Townsend.
James Stevenson
INVENTOR
Geo. H. Eastman
per attys.
A. H. Evans & Co.
N. PETERS, PHOTO-LITHOGRAPHER, WASHINGTON, D. C.

UNITED STATES PATENT OFFICE.

GEORGE H. EASTMAN, OF MINNEAPOLIS, MINNESOTA.

IMPROVEMENT IN GRIST-ALARMS.

Specification forming part of Letters Patent No. 154,948, dated September 15, 1874; reissue No. 6,655, dated September 21, 1875; application filed May 6, 1875.

*To all whom it may concern:*

Be it known that I, GEORGE H. EASTMAN, of Minneapolis, Minnesota, have invented certain new and useful Improvements in Millstone-Alarms, of which the following is a full, clear, and exact description, reference being had to the accompanying drawings making a part of this specification, in which—

Figure 1 is a longitudinal center-section view of my device, showing the conduit-pipe A empty. Fig. 2 is the same, showing the position of the pallet B when the pipe A is filled with running grain.

The object of my invention is to secure a simple, cheap, and perfectly-effective device that shall give to the miller or his assistant due notice that the material running through a conduit-pipe to be ground has or is about to run out, said notice allowing of ample time to take such steps as may be necessary to prevent the grinding-surfaces of the millstones from coming in contact; and it consists, first, in operating the alarm by means of grain passing from the grain-bin to the hopper; and, secondly, in the combination of devices hereinafter explained for giving the alarm.

It is well understood among millers that an alarm to be practical must allow the miller time to reach the hopper after the alarm has been given. Hence the object of my invention in utilizing the running grain in the conduit-pipe to give the alarm, as this affords the miller an opportunity to act effectively after the alarm has been given.

To enable others skilled in the art to make and use my invention, I will proceed to describe the exact manner in which I have carried it out.

In the said drawings, A is a conduit-pipe, which leads from a grain-bin to a hopper. Within the pipe A is placed the pallet B, said pallet being hinged or pivoted at the point C. At right angles to, and attached to the pallet at the point of pivoting, is a detent-pawl, H, projecting into the alarm-box sufficiently far to catch on the teeth of the wheel E. On the opposite side of wheel E is an escapement-pallet pivoted to the case at its center, and a prolongation, I, of the pallet has a hammer, K, upon it to strike the bell P. The wheel E has a cogged hub on its inner face which engages the teeth of a wheel, E′, upon which lies a coiled spring, one end being fastened to the spindle of the wheel and the other end to its face at *a*. The spring is wound by means of a key fitting its spindle.

The exit of the grain from the conduit-pipe A allows the pallet B within said pipe to drop, as seen in Fig. 1, which withdraws the projecting spur H from out the cog-wheel E, allowing its escape from the detent and the spring to revolve with the wheel E′, which, in turn, revolves the wheel E and gives the hammer K an intermittent motion through the escapement, striking the alarm.

The pallet B may be of any desired shape or form that may be required by the conduit-pipe to produce the action necessary to operate the alarm.

Having thus described my invention, what I claim as new, and desire to secure by Letters Patent, is—

1. The combination of a grist-alarm with the conduit-pipe for the passage of grain in a mill, substantially as and for the purpose set forth.

2. In combination with the grain-conduit A, a swinging pallet, B, and suitable mechanism for giving an alarm, substantially as and for the purpose set forth.

3. The grain-conduit A and the swinging pallet B, in combination with the detent-pawl H, clock-mechanism E E′, hammer K, and alarm P, all constructed, arranged, and operated substantially as set forth.

GEORGE H. EASTMAN.

Witnesses:

D. A. SECOMLER,
WM. D. HULL.